INVENTOR.
ERIC BAJARS

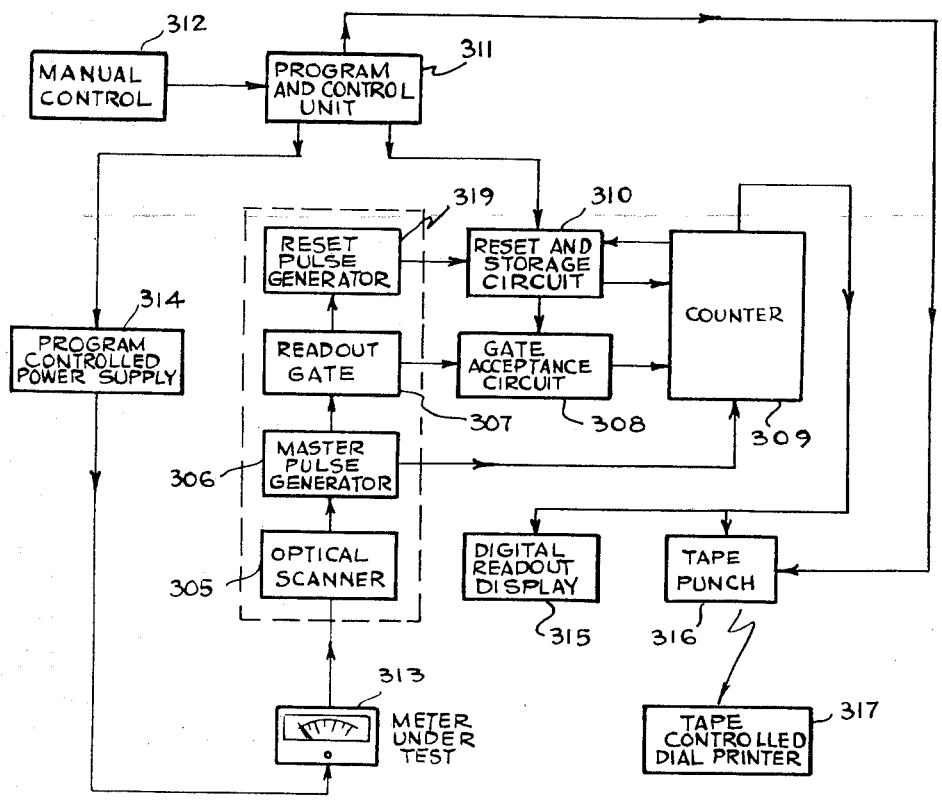
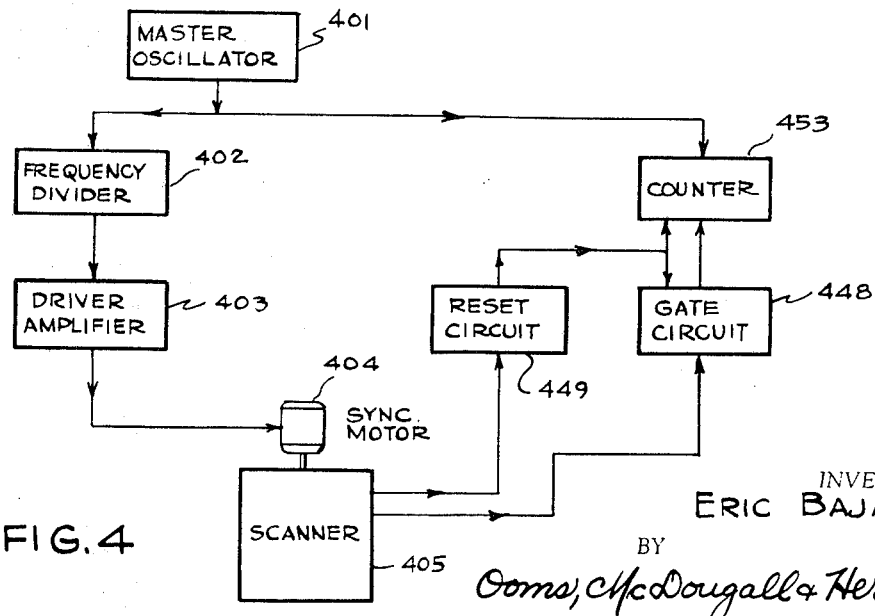
FIG. 3
FIG. 4

United States Patent Office 3,349,325
Patented Oct. 24, 1967

3,349,325
AUTOMATIC METER-CALIBRATION APPARATUS HAVING FLYING SPOT POINTER SENSING MEANS
Eric Bajars, Elmhurst, Ill., assignor to American Gage & Machine Company, Chicago, Ill., a corporation of Illinois
Continuation of application Ser. No. 227,200, Oct. 1, 1962. This application Apr. 4, 1967, Ser. No. 633,344
8 Claims. (Cl. 324—74)

ABSTRACT OF THE DISCLOSURE

A calibrating construction for meters having a rotary indicating pointer. A scanner is adapted to move across the face of the meter, and a light beam associated with the scanner intercepts the pointer once during each revolution. An impulse generating means having a rate of operation proportionally related to the rotation of the scanner is connected to a counter. Recording on the counter begins at a reference point defined by a mask positioned on the meter face and automatically ceases when the beam associated with the scanner intercepts the pointer.

---

Figure 1:
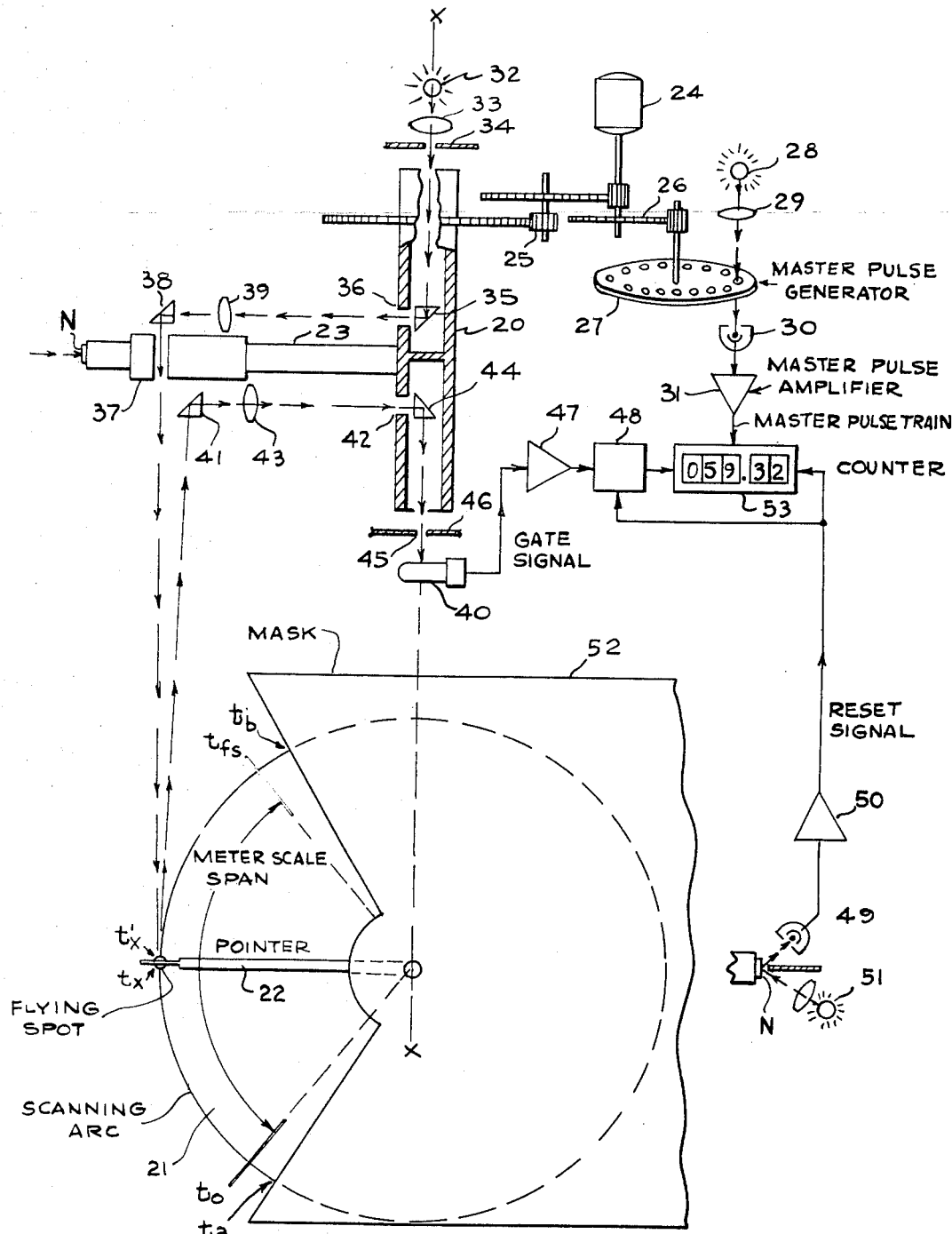

This application is a continuation of applicant's application Ser. No. 227,200 filed Oct. 1, 1962, and now abandoned.

This invention relates to apparatus for automatic calibration of meter scales; in particular, it involves a novel combination of components which cooperate to provide direct digital information from which the scale division lines on a meter face may be accurately drawn.

Scale calibration has long been one of the costly and time-consuming bottlenecks in the manufacture of highly accurate meters.

A "meter," as used herein, is a device wherein the value of a parameter being measured is indicated by the position of an index member, such as a pointer, relative to a pre-marked scale. In such meters, the index pointer normally rotates as the value of the parameter changes, and the scale is accordingly marked along a circular arc. It is to the calibration of meters of this last-mentioned type that the present invention is particularly adapted.

Among the most widely used types of meters are the so-called D'Arsonval moving-coil instruments, wherein the pointer deflection is responsive to changes in the magnitude of a unidirectional electric current flowing through a coil of wire mounted for rotation in a magnetic field, and the present invention will be specifically described with respect to the calibration of such an instrument. It should be understood, however, that the invention may equally be used for calibrating other types of electrical meters as well as non-electrical instruments such as diaphragm-actuated pressure gauges and the like.

To calibrate a meter, the instrument is connected to a source of current or other parameter to be measured, and the value of the parameter is progressively varied in steps throughout the entire range desired. The position of the pointer or other index element relative to the scale is noted for each incremental value of the parameter, and the scale is marked accordingly. When done by hand in a laboratory, this is a very expensive and time-consuming procedure.

(In many cases, meters are designed to provide a pointer deflection that is substantially proportional to the value of the parameter being measured, and in low-cost instruments, where a high degree of accuracy is not essential, the scales are often pre-printed with markings positioned on the assumption of true proportionality between parameter value and deflection. Because exact proportionality seldom exists over the whole range of deflection, however, this method, while quick and inexpensive, is not sufficiently accurate for calibration of precision instruments.)

The hand-marking method of calibrating a meter, in addition to being costly and slow, is naturally subject to a variety of human errors. Among these are:

(1) Errors in reading from a logging dial the deflection angle for a given parameter value, or in the equivalent procedure of making temporary marks, on a blank dial face, corresponding to various parameter values.

(2) Drafting errors in drawing the final scale division lines, which should correspond exactly to the recorded angular information or the previously established temporary scale-marks.

(3) Errors due to misalignment in replacing, orienting, and fashioning the finished dial plate on the meter.

Of the above-listed errors, the most significant, as a practical matter, are the errors in reading and recording the angular position of the meter needle as the parameter is varied; the major object of this invention is to provide an apparatus for eliminating such errors by automatically sensing and digitally recording the progressive angular positions of an indicating needle.

With the aid of my invention, as hereinafter described, the indicating needle of a meter to be calibrated may be progressively shifted in desired increments throughout its entire intended range of movement, and the angular position of the needle corresponding to each selected parameter value is automatically recorded to whatever degree of accuracy is required by the application, such angular position being read out directly in digital angular units. This digital information can be utilized directly for the manual marking of a dial plate by a skilled draftsman working with a precision angular divider head. Alternatively, it can be stored on tape or the like and used to control an automatic dial printer.

Figure 2:
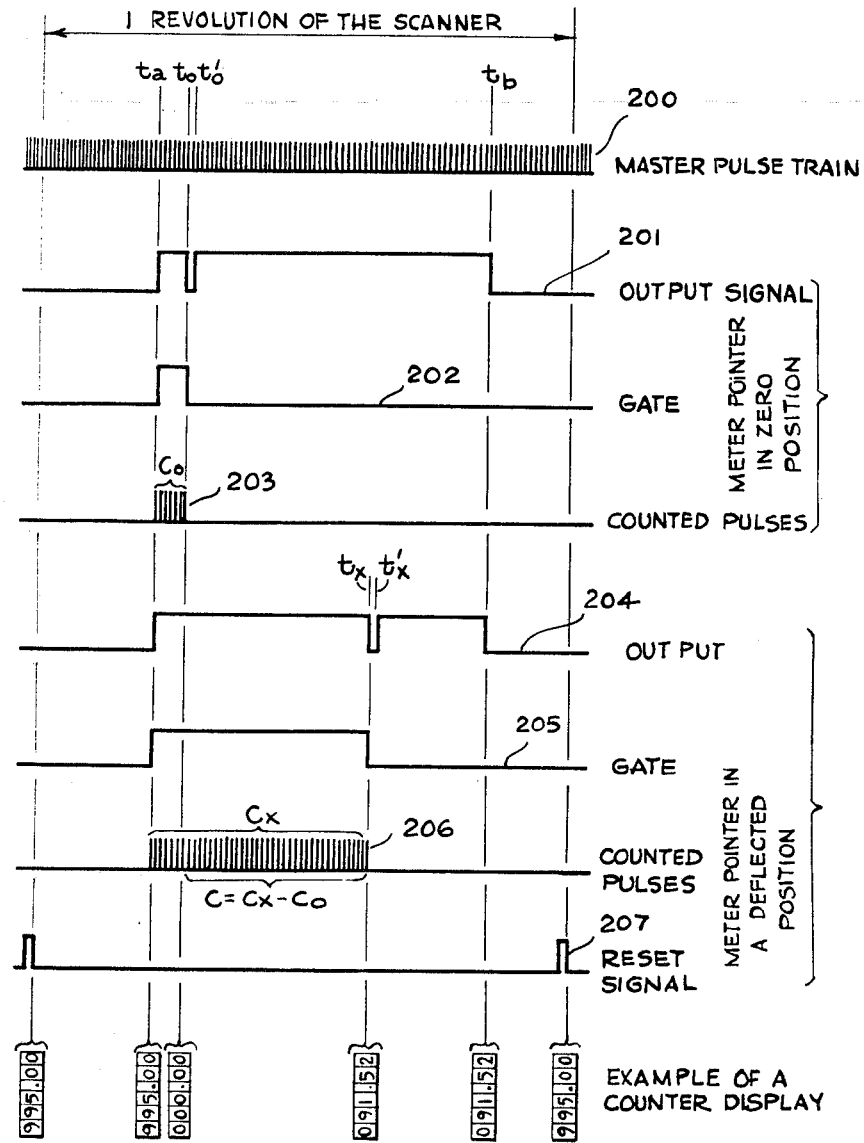

In the appended drawing, I have shown, in diagrammatic form, certain typical embodiments of my invention. Specifically, FIGURE 1 is a schematic and diagrammatic showing, partly in section, of the mechanical and electrical components of one embodiment; FIGURE 2 is a graphic representation showing as a function of time the wave forms of various electrical signals developed in the FIGURE 1 apparatus; FIGURE 3 is a block diagram showing a more elaborate embodiment of my invention, wherein the sequence of functions is automatically programmed; and FIGURE 4 is a block diagram illustrating a further embodiment of the invention similar in principle to the FIGURE 1 apparatus but differing therefrom in that certain of its components are electrically synchronized, rather than mechanically synchronized as in FIGURE 1.

In FIGURE 1, I show an arrangement in which the meter to be calibrated is rigidly held in a jig (not shown) with the axis of rotation of the meter movement coaxially aligned with the rotational axis of a hollow shaft 20. While the face of the meter dial plate 21 is shown in FIGURE 1 in plan view and shaft 20 is illustrated in vertical section, it will be understood that the showing is diagrammatic and that the plane occupied by the dial plate 21 is actually perpendicular to the rotation axis of shaft 20. The pointer 22 of the meter being calibrated is shown in its normal position overlying the dial plate 21.

An outwardly projecting scanner arm 23 is rigidly mounted on shaft 20 for rotation therewith. Shaft 20 is continuously rotated by a motor 24 coupled to shaft 20 through a suitable backlash-free gear train 25. Also driven by motor 24, through another backlash-free gear train 26, is a disc 27 containing a plurality of precisely positioned, uniformly spaced perforations or slots, circularly arranged. A stationary light source 28 in cooperation with a condensing optical system 29 casts a sharply focused light beam on the disc 27, in a radial position whereat the beam periodically passes through the successive perforations in rotating disc 27 and thereby intermittently impinges on photocell 30. The train of electrical pulses thus generated by photocell 30 is raised in power level by amplifier 31, the output of amplifier 31 thus providing a "master pulse train," the repetition rate of which is directly proportional to the angular velocity of the disc 27.

Since the hollow shaft 20 and scanner arm 23 are driven about their own axis of rotation by the same motor 24 which drives disc 27, a direct proportional relationship also exists between the repetition rate of the master pulse train and the angular velocity of the shaft 20 and scanning arm 23. In other words, a specific number of pulses in the master pulse train corresponds exactly with a specific degree of angular travel of the scanner arm 23, regardless of its absolute velocity.

A stationary light source 32, cooperating with a suitable condensing optical system 33 and iris 34, directs a light beam into the upper end of the hollow shaft 20, the beam being accurately directed along the rotational axis of the shaft. A prism (or mirror) 35 guides the light beam outwardly through aperture 36, cut in the wall of shaft 20 directly above the scanner arm 23.

At the outer end of the scanner arm 23 is a radially adjustable reflector assembly 37, movable back and forth on the arm 23 to accommodate various scale arc radii. This reflector assembly 37 includes a prism or mirror 30, with an accompanying condensing lens 39, operative to direct the light beam from source 32 downward onto the dial plate 21.

Light reflected upward from the dial plate 21 strikes prism 41, is thereby directed back toward shaft 20, and enters aperture 42 in the wall of shaft 20 after being focused by condensing lens 43. Inside shaft 20, this returning beam of light is directed by prism 44 downward arong the axis of the shaft 20, and it ultimately impinges on photomultiplier 40 after passing through iris 45 in masking plate 46.

The electrical output of the photomuliplier 40 is employed as a gate signal for governing the counting of individual pulses in the aforementioned master pulse train; the manner in which this is done will be described more fully in the following paragraphs thereof. For the present it will suffice to note that the output signal from photomultiplier 40 is amplified in amplifier 47 and then fed as a gate signal into gate network 48. Gate network 48 is also fed by a reset signal derived from photocell 49 and amplified in amplifier 50. Photocell 49 is energized once during each revolution of the shaft 20, by light from a source 51 which, as arm 23 passes a predetermined position, is reflected off a mirror surface N at the extreme end of arm 23. This arrangement is indicated diagrammatically in the lower right-hand portion of FIGURE 1.

Overlying substantially all of the dial plate 21 except the portion traversed by the pointer 22 is a mask 52, made of dark metal or other material having a non-reflective surface. As indicated in FIGURE 1, mask 52 is relieved throughout the arcuate sector indicated by the dial plate 21 which is traversed by the pointer 22 during meter operation and which, therefore, is ultimately to be marked with an indicating scale.

From a study of the foregoing paragraphs in conjunction with FIGURE 1, the skilled reader will have grasped the fact that the apparatus described will provide a flying light spot which describes a circular path having as its center the axis of shaft 20, such axis, as previously noted, being also the axis of rotation of the meter movement to be calibrated. During portions of the rotation of shaft 20 in which the light beam strikes the mask 52, the light energy reflected back to photomultiplier 40 is small; similarly, the reflected light intensity is small during the instant in each revolution of shaft 20 when the light beam is reflected off the pointer 22. During the remainder of each cycle of revolution of the shaft 20, however, the light beam is reflected from the face of dial plate 21, with relatively great intensity, and during those periods it produces a correspondingly increased output signal from photomultiplier 40.

A digital counter 53 is fed by amplifier 31 with the electrical pulses which constitute the previously mentioned master pulse train, and the operations of counter 53, in counting the individual pulses of the master pulse train, are under the control of the gate network 48 and the reset signal derived from amplifier 50. These control connections are indicated diagrammatically on FIGURE 1, by conventional arrow-tipped leads.

In operation of the apparatus of FIGURE 1, the basic principle involves accurate evaluation of angular magnitude by the counting of the pulses of the master pulse train occurring during the time interval required for the flying light spot to traverse the angle to be measured.

As a practical matter, in the calibration of a meter, the angles of which measurement is desired are those defined by the rest position of pointer 22 and the other respective positions of that pointer when the parameter to be measured by the meter is set at various values throughout the meter's range. Convenient digital evaluation of these angles is accomplished in the present invention in the following manner:

Suppose the meter is not energized and the pointer 22 is in its proper zero position, indicated on FIGURE 1 by the dotted line $t_0$. As the flying spot, traversing a clockwise path, runs off the edge of mask 52 at time $t_a$, the amount of light striking photomultiplier 40 is suddenly increased, due to the better reflectivity of dial plate 21 as compared to mask 52, and this produces a sudden rise in the output voltage from photomultiplier 40. This output voltage is graphically represented in FIGURE 2 by the curve 201, the master pulse train for a period representing one revolution of shaft 20 being graphically represented in the same figure by the curve 200.

As the flying spot encounters the pointer 22 at time $t_0$, the magnitude of reflected light is sharply reduced and the output voltage from photomultiplier 40 is correspondingly reduced, as indicated by the drop-off in curve 201 at time $t_0$. This reduced voltage continues until time $t'_0$ when the spot overruns the pointer 22 and again is reflected off of the dial plate 21. At this time $t'_0$, again as shown on curve 201, the output voltage from photomultiplier 40 rises again to its maximum value and remains there until the flying spot, having traversed the exposed portion of the dial plate, again encounters the mask 52 at time $t_b$.

This voltage pattern is repeated indefinitely as the flying spot follows its circular path around the instrument axis, so long as nothing occurs to change the position of pointer 22.

The output signal represented by curve 201, after being amplified by amplifier 47, is fed to gate network 48, wherein, by conventional circuitry well known to the art, a gate signal 202 is fashioned which contains only the voltage step occurring between times $t_a$ and $t_0$, the remainder of the voltage pattern of curve 201 being suppressed. This is done, as skilled readers will understand, by conventional circuitry utilizing the trailing edge of the output signal 201 occurring at time $t_0$ to de-activate the gate network and leave it "dead" until re-activated for the generation of a new gate by occurrence of the reset signal 207. This reset signal, it will be recalled, is generated by the passage of scanner arm 23, once each revolution, past the light source 51 and photocell 49. The photocell 49 and light source 51 are so positioned that this reset signal will be generated during a portion of the revolution of the scanner in which the flying spot is traversing the mask 52.

When re-activated by reset signal 207, the gate network 48 is again ready to generate a new gate pulse 202 the next time a voltage step occurs in the output signal 201, i.e., the next time the flying spot runs off the mask and begins reflecting off the surface of the dial plate 21.

The gate signal 202 controls the digital counter 53, the counter being energized and operative to count the pulses of the master pulse train only during periods when the gate is "open." In the case under discussion, this means that the pulses will be received and counted by the counter 53 during the time interval between $t_a$ and $t_o$, as indicated on FIGURE 2 by the reference number 203, the number of pulses in such time interval being designated $C_o$.

From the foregoing discussion, it will be seen that the number of pulses $C_o$ recorded by the counter 53 when the pointer 22 is in its rest position represents an accurate measure of the angle defined by the near edge of the mask 52 and the pointer's rest position. It should be noted that the reset signal from photocell 49, in additional to re-activating the gate network 48, is also fed to the counter 53 to reset the counter to its "start" position once each revolution.

Now suppose the meter is energized by a current representing some specific value of parameter to be measured by the meter, and the pointer 22 is correspondingly deflected to a new position represented on FIGURE 1 by $t_x$. Under these conditions, the apparatus and circuits will work as before except that now the output signal from photomultiplier 40 will be of the form represented on FIGURE 2 by the curve 204, the gate signal generated by network 48 will be of the form represented on FIGURE 2 by the curve 205, and the counter 53 will count and record the master pulses occurring in the interval between time $t_a$ and time $t_x$, as indicated on FIGURE 2 by the reference number 206. The number of pulses counted in such time interval is represented on FIGURE 2 by the symbol $C_x$.

Plainly, the quantity of angular deflection of the needle 22 occasioned by the particular value of parameter being applied to the meter is accurately represented by the pulse count C, equal to $C_x$ minus $C_o$. This is graphically shown on FIGURE 2.

By suitable design of the disc 27 and the gear trains 25 and 26, the number of master pulses per revolution of the scanning arm 23 may be made to represent directly angular measure in whatever units may be desired. For example, by designing the system to provide 36,000 master pulses per revolution of the scanner arm, each pulse in the master pulse train will represent 0.01 degree of arc, and the counter 53 will thereby read arc directly in degrees and decimal fractions thereof.

Obviously, the angle represented by the pulse count C, being the angular deflection experienced by the pointer 22 in moving from position $t_o$ to position $t_x$, could be determined simply by evaluating the two pulse counts $C_x$ and $C_o$ and subtracting the latter from the former by a manual operation. In the illustrated embodiment of my invention, however, this step may be eliminated in the following manner:

Suppose it is determined, after the meter has been positioned in the jig for calibration, that exactly 5.00 degrees of angle exist between the edge of mask 52 and the rest position of pointer 22. Suppose also that the counter 53 is of the type, as illustrated, which counts to five digits and then repeats. If, under these conditions, the initial setting of the counter is made 995.00, then, in scanning an unenergized meter, the counter reading which represents the rest position of the pointer 22 will be 000.00. When this is done, the reading on the counter when the pointer 22 is at position $t_x$ will indicate directly in degrees and hundredths of a degree the precise angle traversed by the pointer 22 in moving from rest position to position $t_x$.

As will be readily understood, the angle-determining procedure just described may be repeated for any desired number of arbitrary parameter values, and the angular pointer deflections for each value may be recorded in any suitable manner for use in calibration of the dial plate 21.

The presetting of the apparatus to provide a counter reading of 000.00 for the rest position of the pointer 22 may be accomplished by presettting the counter so that its initial reading is an arbitrary number of pulses "less" than zero, the relative angular positions of the mask 52 and the meter under test being then adjusted so that the desired counter reading of 000.00 is attained when the pointer 22 is at rest, the meter being unenergized. Alternatively, if a sufficiently sophisticated counter 53 is being used, the meter to be tested may simply be placed in position under mask 52 without concern for its exact angular position, and the pulse count $C_o$ representing the angle $t_a - t_o$ may be determined. This number may then be automatically complemented and stored for the purpose of automatically presetting the counter for all subsequent angular measurements made with that particular meter.

If this last-described procedure is being used, a new determination of preset count will of course be required each time a new meter is placed in the apparatus for calibration, but it need be performed only once for each meter, at the beginning of the calibration procedure.

In the counter readings indicated at the bottom of FIGURE 2, a typical calibration run is illustrated, the preset value being 995.00, the rest position count being 000.00, and the pulse count at pointer position $t_x$ being 091.52. Thus, in this example, a quantity of meter deflection occasioned by the particular value of parameter applied to the meter was 91.52 degrees.

Electrical synchronization of the master pulse train and the scanning arm 23 may be employed in lieu of the electro-mechanical synchronization used in the FIGURE 1 embodiment of my invention, just described. Such an electrically synchronized arrangement is diagrammatically illustrated in FIGURE 4. In the FIGURE 4 embodiment, the master pulse train is generated by a stable master oscillator 401 of any suitable type, such as one utilizing a piezoelectric crystal or magnetostriction frequency control element. The master pulse train from oscillator 401 is fed, as before, to a counter 453, the counter being under the control of a gate network 448, again as in the FIGURE 1 embodiment. The pulse train from oscillator 401 is also, in the FIGURE 4 structure, reduced to a lower frequency by a frequency divider 402, the resulting lower frequency is raised in power level by a driver amplifier 403, and the resulting current is fed to a synchronous motor 404, which drives the scanning apparatus 405 at a speed which is synchronously related to the frequency of the master pulse train.

As skilled readers will understand, the apparatus diagrammatically shown in FIGURE 4 as a "scanner" embraces the mechanical and optical structure assocaited in FIGURE 1 with rotary scanning arm 23, or its equivalent. The meter under test and the mask 52 are not represented as such in the diagrammatic showing of FIGURE 4, but it is understood that they are used in conjunction with the scanner 405 in the same manner as heretofore described with reference to FIGURE 1.

The reset circuit 449 of the FIGURE 4 embodiment generates a reset signal which restores the counter to "start" position once each revolution of the scanner and prepares the gate circuit for generation of a new gate signal once each scanner revolution, just as in the FIGURE 1 form of the invention.

In short, the apparatus of FIGURE 4 works in the same manner as that of FIGURE 1 except that the frequency of the master pulse train is made the governing factor with which the speed of scanning rotation is synchronized, whereas in the FIGURE 1 embodiment the independent controlling factor is the scanning speed, and the frequency of the master pulse train is electromechanically synchronized therewith. Skilled readers will appreciate that either type of synchronization will yield essentially the same results.

In the embodiments of the invention described herein so far, it has been assumed that some of the important steps in the calibration of a meter would be carried out manually, or at any rate under manual control. Thus, in the embodiments heretofore described, it has been assumed that a human operator would successively shift through a progression of values the particular parameter to be measured by the meter under test, and similarly it has been assumed that the actual dial marking would be done by a skilled draftsman with a precision protractor and utilizing the angular data provided by my invention. These functions can, if desired, be automatically performed; FIGURE 3 shows, in block diagram, an apparatus that is so designed. Therein I show, in block form, a basic embodiment of my invention generally similar to that of FIGURE 1, comprising an optical scanner 305, a master pulse generator 306, electromechanically synchronized with the scanner 305 so as to provide a predetermined number of master pulses for each revolution of the scanner 305, gate circuits 307 and 308 for feeding the master pulse train to the counter 309 during the time intervals in which the scanner 305 is traversing arcs which are of interest in the calibration procedure, and reset-circuit elements 319 and 310 for restoring the counter to its "start" position after each angle measurement and for governing the gate circuit in the manner previously described in FIGURE 1.

This whole basic arrangement is under the control of a master programming unit 311 which can be started by a manual control 312 each time a meter 313 is to be calibrated but which can proceed automatically thereafter.

A program controlled source of the parameter to be measured by the meter is designated 314 on FIGURE 3 and is connected to the meter 313 being calibrated. For example, if the meter being calibrated is a current-measuring device, the element 314 might be a power supply designed, under the control of master unit 311, to supply a plurality of current values to the meter 313 in progressive incremental steps, each value of current being maintained long enough to permit automatic measurement of the pointer deflection produced thereby. In this connection, the master unit 311 would control also the reset circuit 310 so as to inhibit the flow of master pulses to the counter during the period between measurements in which the pointer is moving to and stopping at a new position. The counter output, comprising a succession of digital readings representing angles, is fed simultaneously to a digital readout unit 315 and, at the same time, to an automatic tape punch machine 316. (As will be understood by skilled readers, the element 316 may also be a card-punch device, a magnetic tape, or any of the other conventional systems of long-term data storage currently used in the automatic machine art.)

When the recording of calibration data for a given meter 313 has been completed, it will of course be replaced by another meter for calibration. The information permanently recorded by unit 316 may be used in conventional manner to operate a tape-controlled dial printer 317, for actually marking with appropriate calibration marks the dial scales to be used with meters that have been calibrated.

A fully automatic embodiment of my invention, as illustrated in FIGURE 3, involves substantially more capital investment and structural complexity than does a simpler embodiment such as that of FIGURE 1. The degree to which automation should be incorporated in a given embodiment will depend, of course, on economic factors.

While I have in this specification described in considerable detail certain specific embodiments of my invention, this has been for illustrative purposes only. The scope of my invention is to be determined primarily by reference to the appended claims.

That which is claimed is:
1. Apparatus for calibrating meter movements of the type having a rotary indicating pointer, comprising, in combination, means for securing a meter movement in a fixed position wherein the pointer of said movement is rotatable in a predetermined plane around a predetermined axis, means defining a plane surface behind said pointer and parallel to said predetermined plane, said surface being characterized by a light-reflectivity characteristic different from that of said pointer, a scanner disposed in front of said predetermined plane and mounted for rotation around said predetermined axis, said scanner being operative when rotated to direct toward said plane surface a narrow light beam moving in a circular path around said axis, said beam thereby intercepting said pointer once in each revolution, motive means for said scanner operative to rotate the same, impulse-generating means operatively connected to said motive means, said impulse generating means operating during scanner rotation to generate impulses having a repetition rate proportional to the angular velocity of said scanner, an impulse counter fed by said generating means, the number of pulses fed to said counter by said generating means being controllable independently of the angular velocity of said scanner whereby a very high number of pulses can be fed to the counter irrespective of the physical size of the scanner, means having a light-reflectivity characteristic different from that of said surface disposed adjacent said surface in the path of said light beam defining a reference position which is substantially fixed relative to said surface, photo-sensitive means responsive to light reflected from said surface for detecting when said beam passes said reference position and when said beam intercepts said pointer, and means controlled by said photo-sensitive means for actuating said impulse counter during the time intervals in which said light beam is traversing its circular path between said reference position and the position at which said beam intercepts said pointer, thereby providing a digital indication representing the magnitude of the angle defined by said reference position, said axis, and said intercept position.

2. The apparatus defined in claim 1 wherein said means controlled by said photo-sensitive means is operative to start said impulse counter when said light beam passes said reference position and to stop said impulse counter when said light beam intercepts said pointer.

3. The apparatus defined in claim 1 having also means successively applying progressively different parameter values to said meter movement, thus producing progressively different pointer deflections and permitting successive digital evaluation of the magnitudes of the angles successively defined by said reference position, said axis, and said progressively different pointer deflections.

4. The apparatus defined in claim 1 wherein said impulse generating means comprises an assembly including an apertured disc, a light source on one side of the disc adapted to direct light through the apertures in the disc, and light sensitive means on the opposite side of the disc adapted to generate pulses in response to the passage of light through the apertures, and including drive means for said disc connected to said motive means for said scanner, said drive means operating to rotate said disc whereby said apertures successively permit passage of light to said light sensitive means, said drive means including gears whereby said disc is adapted to be rotated at a substantially higher speed than the speed of said scanner.

5. The apparatus defined in claim 1 wherein said impulse generating means comprises an oscillator having an output fed to said counter and fed to a synchronous motor providing the motive force for said scanner.

6. The apparatus defined in claim 1 wherein said scanner includes light reflecting means directing said beam of light toward said surface, said light reflecting means being radially adjustable relative to said scanner whereby the scanner can be utilized in conjunction with meter movements having scales of varying arc radii.

7. The apparatus defined in claim 1 whereby said impulse generating means produces a train of electrical impulses.

8. The apparatus defined in claim 1 wherein said means adjacent said surface comprises a mask having an open portion, the limits of said open portion being defined by opposed side edges, said side edges extending along radii from the axis of the meter scale, and wherein the extent of said open portion is slightly larger than the span of the meter scale.

References Cited

UNITED STATES PATENTS

| 2,351,081 | 6/1944 | Swift | 250—236 XR |
| 3,001,131 | 9/1961 | Oliver | 324—74 |

FOREIGN PATENTS 337,667  5/1959  Switzerland.

RUDOLPH V. ROLINEC, *Primary Examiner.*

WALTER L. CARLSON, *Examiner.*

E. L. STOLARUN, *Assistant Examiner.*